United States Patent Office 3,150,162
Patented Sept. 22, 1964

3,150,162
THIOPHOSPHONIC ACID ESTERS
Gerhard Schrader, Wuppertal-Cronenberg, Germany, assignor to Farbenfabriken Bayer Aktiengesellschaft, Leverkusen, Germany, a corporation of Germany
No Drawing. Filed Aug. 30, 1960, Ser. No. 52,759
Claims priority, application Germany Sept. 3, 1959
8 Claims. (Cl. 260—461)

The present invention relates to and has as its objects new and useful insecticidal thiophosphonic acid esters and methods for their production. Generally the new compounds of this invention may be represented by the following formula

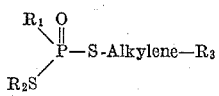

in which $R_1$ stands for a lower alkyl radical eventually substituted, $R_2$ stands for a lower alkyl radical and $R_3$ stands for alkyl, aryl or acyl mercapto groups, a secondary amino group, an alkoxy group, an amino carbonyl group, a cyano group, an eventually substituted aryl radical or another

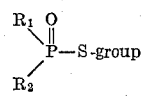

Furthermore the alkylene group in the above mentioned formula may be interrupted by hetero atoms such as oxygen, sulfur or nitrogen.

In accordance with this invention it has been found that these compounds may be obtained by reaction of corresponding S-alkyl thiolphosphonic acid salts with corresponding halo-alkyl compounds.

Suitable halo-alkyl compounds as it is to be seen from the above general formula are compounds such as

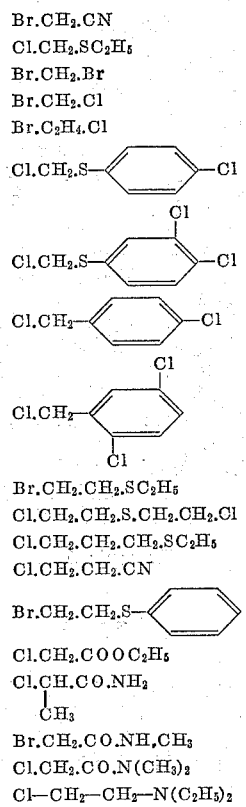

The phosphorous starting materials, namely the S-alkyl thiolphosphonic acid salts may be obtained exactly according to the same methods as they are known for the production of corresponding phosphoric acid compounds, which are described e.g. by P. S. Pischtschimuka: J. Russ. Phys. Chem. Soc., 44 (1912), pp. 1406–1554.

It is not necessary to isolate the S-alkyl thiolphosphonic acid salts, but the reaction products of alkali metal mercaptides and the thionophosphonic-O.S-diesters may be used as such for further reaction with the corresponding substituted alkyl halides. Sometimes it is advisable to carry out the reaction in inert solvents, especially suitable is alcohol.

The reaction is carried out preferably at slightly elevated temperatures, i.e. slightly below or at the boiling point of the solvent used, which is about 70–80° C. when using alcohol as a solvent.

The new compounds of the present invention very effectively kill insects like flies, mites, aphids, etc. They distinguish themselves especially by a good contact-insecticidal activity and at the same time by an activity on eating insects such as caterpillars. They may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers, alcohols, especially lower alcohols, such as methanol or ethanol, ketones, especially lower ketones, such as acetone or methyl ethyl ketone, liquid hydrocarbons and the like. The new compounds may furthermore be used in combination with each other or with known insecticides, fertilizers, etc.

As examples for the special utility of the inventive compounds the compounds of the following formulae

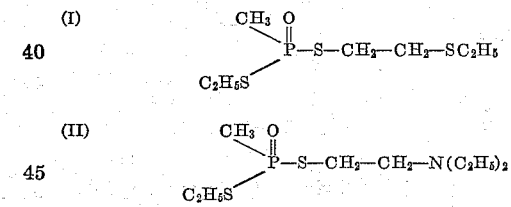

have been tested against aphids and spider mites respectively.

Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentrations. The tests have been carried out as follows:

(a) Against aphids (with compound I): of the type Doralis fabae. Heavily infested bean plants (Vicia faba) have been sprayed drip wet with solutions as prepared above in a concentration of 0.001%. The effect has been determined by evaluation after 24 hours by counting the dead pests either on the surface of the soil or still remaining on the plants. 100% killing has been obtained.

(b) Against spider mites (with compound II): Bean plants (Phaseolus vulgaris) of about 15 inches height were sprayed drip wet with 0.0001% solutions prepared as indicated above. The bean plants have been infested heavily with the two-spotted spider (species Tetranychus telarius). Evaluation has been carried out after 24 hours, 48 hours and 8 days. 100% killing has been obtained.

The following examples are given for the purpose of illustrating the present invention:

Example 1

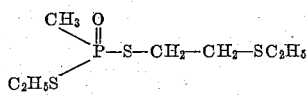

25 grams of potassium ethylmercaptide are suspended in 100 ml. of anhydrous ethanol. At a temperature of about 75° C. there are added while stirring 46 grams (0.25 mol) of methylthionophosphonic acid-O.S-diethyl-ester (B.P.$_1$ 61° C.). The temperature is kept at 75° C. for one hour and while stirring there are added 32 grams of β-ethylmercapto-ethylchloride. The temperature is kept at 80° C. for another hour, then the mixture is cooled to room temperature and the reaction product is poured into 300 ml. of ice-water. The oil which precipitates is taken up in 200 ml. of benzene. The benzene solution is washed with water, separated and dried with anhydrous sodium sulfate. By fractionating there are obtained 30 grams of the new ester (B.P.$_{0.01}$ 74° C.) as a waterunsoluble, colorless oil. Yield 49% of the theoretical.

Calculated for mol 244: S, 39.3%; P, 12.6%. Found: S, 38.1%; P, 11.8%.

Aphids are killed completely with 0.001% solutions. Spider mites are killed to 95% with 0.001% solutions. The compound has an ovicidal activity. Systemic action with 0.1% solutions 100%.

When using instead of β-ethylmercapto-ethylchloride the equimolecular amount of β-phenylmercapto-ethylchloride there is obtained the compound of the following formula:

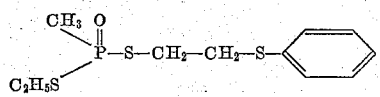

When using p-chloro-phenylmercapto-methylchloride there is obtained the compound of the following formula

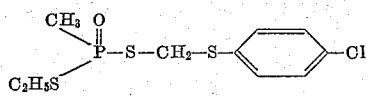

Example 2

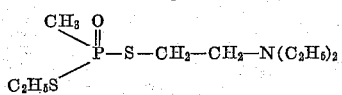

25 grams of potassium ethylmercaptide are suspended in 100 ml. of anhydrous ethanol. At 80° C. there are added while stirring 46 grams (0.25 mol) of methylthionophosphonic acid-O.S-diethyl ester. Heating is continued for one hour at a temperature of 75–80° C. and while stirring 35 grams of β-diethylamino-ethylchloride are added. The reaction product is kept at 75° C. for one further hour. After working up is carried out in a usual manner there are obtained 31 grams of the new ester (B.P.$_{0.01}$ 84° C.). The ester is soluble in water. Yield 48% of the theoretical.

Calculated for mol. 255: N, 5.5%; P, 12.2%; S, 25.0%. Found: N, 5.3%; P, 12.6%; S, 24.1%.

Spidter mites are killed completely with 0.0001% solutions. The compound has an ovicidal activity. Aphids are killed completely with 0.01% solutions.

Example 3

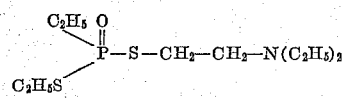

25 grams of potassium ethylmercaptide are suspended in 100 ml. of ethanol. At 70° C. there are added while stirring 50 grams (0.25 mol) of ethylthionophosphonic acid-O.S-diethyl ester (B.P.$_1$ 68° C.). Heating is continued at 80° C. for one hour and while stirring there are added dropwise 35 grams of β-diethylamino-ethylchloride at 70° C. The reaction product is kept at 80° C. for one hour and is then worked up as usual. There are obtained 27 grams of the new ester (B.P.$_{0.01}$ 88° C.). Yield 40% of the theoretical. The ester is a colorless oil which is almost unsoluble in water.

Calculated for mol 155: S, 23.8%; P, 11.5%; N, 5.2%. Found: S, 22.9%; P, 11.7%; N, 4.8%.

Spider mites are killed completely with 0.001% solutions. Aphids are killed to 80% with 0.001% solutions. Systemic action with 0.1% solutions 100%.

Example 4

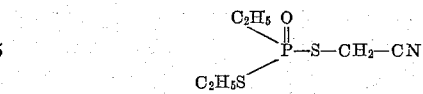

25 grams of potassium ethylmercaptide are suspended in 100 ml. of anhydrous ethanol. At 80° C. there are added while stirring 50 grams (0.25 mol) of ethylthionophosphonic acid-O.S-diethyl ester. Heating is continued for one hour at 80° C. and while stirring there are added 19 grams of chloroacetonitrile at 30–40° C. The reaction product is kept at 40° C. for one hour and is then worked up as usual. In this manner there are obtained 16 grams of the new ester (B.P.$_{0.01}$ 68° C.). Yield 31% of the theoretical. The ester is unsoluble in water.

Calculated for mol 209: S, 30.6%; N, 6.6%; P, 14.8%. Found: S, 29.9%; N, 6.1%; P, 14.7%.

By the same way but using instead of chloroacetonitrile the equimolecular amounts of α-chloropropionic amide there is obtained the compound of the following formula:

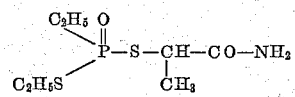

When using equimolecular amounts of chloroacetic acid ethyl ester there is obtained the compound of the following formula:

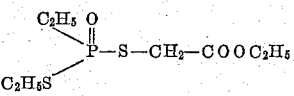

Example 5

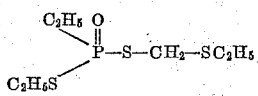

25 grams of potassium ethylmercaptide are suspended in 100 ml. of anhydrous ethanol. At 75° C. there are added while stirring 50 grams (0.25 mol) of ethylthionophosphonic acid-O.S-diethyl ester. Heating is continued for one hour at 80° C. and at 40° C. there are added dropwise while stirring 28 grams of α-chloromethyl-thioethyl ether. The reaction mixture is kept at 40° C. for one further hour and is then worked up in the usual way. In this manner there are obtained 27 grams of the new ester (B.P.$_{0.01}$ 68° C.). Yield 44% of the theoretical. The ester is a colorless oil which is unsoluble in water.

Calculated for mol 157: S, 39.4%; P, 12.7%. Found: S, 38.1%; P, 12.5%.

Flies are killed completely with 0.001% solutions. Systemic action with 0.1% solutions 100%. Caterpillars are killed completely with 0.1% solutions.

Example 6

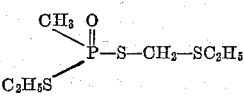

25 grams of potassium ethylmercaptide are suspended in 100 ml. of anhydrous ethanol. At 75° C. there are added 46 grams (0.25 mol) of methylthionophosphonic acid-O.S-diethyl ester. Heating is continued for one hour at 80° C. and then there are added dropwise while stirring 28 grams α-chloromethyl-thioethyl ether at 40° C. The reaction product is kept at 35–40° C. for one further hour and is then worked up in the usual manner. In this way there are obtained 23 grams of the new ester (B.P.$_{0.01}$ 73° C.). Yield 40% of the theoretical. The ester is a colorless oil which is unsoluble in water.

Calculated for mol 230: S, 41.6%; P, 13.4%. Found: S, 40.8%; P, 13.04%.

Flies are killed completely with 0.001% solutions. Aphids and spider mites are killed to 90% with 0.001% solutions. The compound has an ovicidal activity against the eggs of red spider. Systemic action with 0.1% solutions 100%.

If instead of methyl-thionophosphonic acid-O.S-diethyl ester the corresponding chloro-methylthionophosphonic acid ester is used there is obtained the following compound:

$$\begin{array}{c} Cl-CH_2 \quad O \\ \diagdown \quad \| \\ P-S-CH_2-SC_2H_5 \\ \diagup \\ C_2H_5S \end{array}$$

*Example 7*

$$\begin{array}{c} C_2H_5 \quad O \\ \diagdown \quad \| \\ P-S-CH_2-CH_2-SC_2H_5 \\ \diagup \\ C_2H_5S \end{array}$$

25 grams of potassium ethylmercaptide are suspended in 100 ml. of anhydrous ethanol. At 75° C. there are added while stirring 50 grams (0.25 mol) of ethyl-thionophosphonic acid-O.S-diethyl ester. Heating is continued for one hour at 80° C. and then there are added dropwise 72 grams of β-ethylmercapto-ethylchloride at 75° C. The reaction product is kept at 80° C. for one hour and is then worked up in the usual way. There are obtained 42 grams of the new ester (B.P.$_{0.01}$ 79° C.). Yield 65% of the theoretical. The ester is a colorless oil which is unsoluble in water.

Calculated for mol 258: S, 37.0%; P, 12.0%. Found: S, 35.9%; P, 11.9%.

Aphids and spider mites are killed completely with 0.001% solutions. The compound has an ovicidal activity. Systemic action with 0.1% solutions 100%. Caterpillars are killed completely with 0.1% solutions.

*Example 8*

$$\begin{array}{c} CH_3 \quad O \\ \diagdown \quad \| \\ P-S-CH_2-C\equiv N \\ \diagup \\ C_2H_5S \end{array}$$

25 grams of potassium ethylmercaptide are suspended in 100 ml. of anhydrous ethanol. At 75° C. there are added 46 grams (0.25 mol) of methyl-thionophosphonic acid-O.S-diethyl ester. Heating is continued for one hour at 80° C. and at 35° C. there are added 19 grams of chloroacetonitrile. The reaction produce is kept at 35–40° C. for one hour. In this manner there are obtained 15 grams of the new ester (B.P.$_{0.01}$ 72° C.). Yield 31% of the theoretical. The ester is a colorless oil which is unsoluble in water.

Calculated for mol 195: N, 7.0%; S, 32.8%; P, 15.9%. Found: N, 6.8%; S, 31.6%; P, 15.1%.

When using instead of chloroacetonitrile the corresponding equimolecular amount of β-chloropropionic nitrile there is obtained the following compound:

$$\begin{array}{c} CH_3 \quad O \\ \diagdown \quad \| \\ P-S-CH_2-CH_2-C\equiv N \\ \diagup \\ C_2H_5S \end{array}$$

When using instead of chloroacetonitrile an excess of dibromo-methane there is obtained the following compound:

$$\begin{array}{c} CH_3 \quad O \qquad\qquad O \quad CH_3 \\ \diagdown \quad \| \qquad\qquad \| \diagup \\ P-S-CH_2-S-P \\ \diagup \qquad\qquad\qquad \diagdown \\ C_2H_5S \qquad\qquad\qquad SC_2H_5 \end{array}$$

I claim:

1. A thiophosphonic acid ester of the following formula $$\begin{array}{c} R_1 \quad O \\ \diagdown \quad \| \\ P-S-Alkylene-R_3 \\ \diagup \\ R_2S \end{array}$$

in which $R_1$ stands for a member selected from the group consisting of lower alkyl having up to 4 carbon atoms and chloro-substituted lower alkyl having up to 4 carbon atoms, $R_2$ stands for lower alkyl having up to 4 carbon atoms, and $R_3$ stands for a member selected from the group consisting of cyano, lower alkyl-substituted amino, amino carbonyl and lower alkyl-substituted amino carbonyl, and wherein Alkylene stands for a lower alkylene radical having up to 4 carbon atoms.

2. A compound of claim 1 wherein $R_1$ and $R_2$ are each lower alkyl having up to 4 carbon atoms, and $R_3$ is di-lower alkyl amino.

3. A compound of claim 1 wherein $R_1$ and $R_2$ are each lower alkyl having up to 4 carbon atoms and $R_3$ is cyano.

4. A compound of claim 1 wherein $R_1$ and $R_2$ are each lower alkyl having up to 4 carbon atoms and $R_3$ is amino carbonyl.

5. The compound of the following formula $$\begin{array}{c} CH_3 \quad O \\ \diagdown \quad \| \\ P-S-CH_2-CH_2-N(C_2H_5)_2 \\ \diagup \\ C_2H_5S \end{array}$$

6. The compound of the following formula $$\begin{array}{c} C_2H_5 \quad O \\ \diagdown \quad \| \\ P-S-CH_2-CH_2-N(C_2H_5)_2 \\ \diagup \\ C_2H_5S \end{array}$$

7. The compound of the following formula $$\begin{array}{c} C_2H_5 \quad O \\ \diagdown \quad \| \\ P-S-CH_2-CN \\ \diagup \\ C_2H_5S \end{array}$$

8. The compound of the following formula $$\begin{array}{c} CH_3 \quad O \\ \diagdown \quad \| \\ P-S-CH_2-C\equiv N \\ \diagup \\ C_2H_5S \end{array}$$

References Cited in the file of this patent

UNITED STATES PATENTS

| | | |
|---|---|---|
| 2,881,201 | Schrader | Apr. 7, 1959 |
| 2,907,787 | Hoffmann et al. | Oct. 6, 1959 |
| 2,917,533 | Burger | Dec. 15, 1959 |
| 2,965,665 | Gaertner et al. | Dec. 20, 1960 |
| 2,983,748 | Schlor et al. | May 9, 1961 |
| 2,988,565 | Toy | June 13, 1961 |
| 3,014,943 | Schegk et al. | Dec. 26, 1961 |

FOREIGN PATENTS

| | | |
|---|---|---|
| 210,438 | Austria | Aug. 10, 1960 |
| 568,845 | Belgium | July 15, 1958 |
| 797,603 | Great Britain | July 2, 1958 |
| 1,071,701 | Germany | Dec. 24, 1959 |
| 1,109,680 | Germany | June 24, 1961 |